(12) United States Patent
Paek

(10) Patent No.: US 8,126,715 B2
(45) Date of Patent: Feb. 28, 2012

(54) FACILITATING MULTIMODAL INTERACTION WITH GRAMMAR-BASED SPEECH APPLICATIONS

(75) Inventor: Timothy Seung Yoon Paek, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 619 days.

(21) Appl. No.: 12/324,826

(22) Filed: Nov. 26, 2008

(65) Prior Publication Data

US 2010/0131275 A1 May 27, 2010

(51) Int. Cl.
*G10L 15/18* (2006.01)
(52) U.S. Cl. ....................................... 704/257
(58) Field of Classification Search .................. 704/257
See application file for complete search history.

(56) References Cited

U.S. PATENT DOCUMENTS

| | | | |
|---|---|---|---|
| 6,064,959 A | 5/2000 | Young et al. | |
| 6,327,566 B1 | 12/2001 | Vanbuskirk et al. | |
| 6,598,018 B1 | 7/2003 | Junqua | |
| 6,934,682 B2 | 8/2005 | Woodward | |
| 7,103,553 B2 | 9/2006 | Applebaum et al. | |
| 7,809,569 B2* | 10/2010 | Attwater et al. | 704/257 |
| 7,970,615 B2* | 6/2011 | Attwater et al. | 704/257 |
| 2007/0239453 A1 | 10/2007 | Paek et al. | |
| 2008/0162136 A1 | 7/2008 | Agapi et al. | |

OTHER PUBLICATIONS

Lemon, Oliver., "Context-Sensitive Speech Recognition in ISU Dialogue Systems: Results for the Grammar Switching Approach", retrieved at <<http://www.upf.edu/dtf/personal/enricvallduvi/catalog04/papers/07-lemon.pdf>>, p. 7.
"Speech Recognition with Dynamic Grammars Using Finite-State Transducers", retrieved at <<http://citeseerx.ist.psu.edu/viewdoc/summary?doi=10.1.1.3.6243>>, Aug. 5, 2008, p. 2.
Goto, et al., "Speech Completion: On-Demand Completion Assistance Using Filled Pauses for Speech Input Interfaces", Proceedings of the 7th International Conference on Spoken Language Processing (ICSLP-2002), pp. 1489-1492, Sep. 2002., p. 4.
Goto, et al., "Speech Completion: New Speech Interface with On-demand Completion Assistance Using Filled Pauses" retrieved at <<http://staff.aist.go.jp/m.goto/SpeechCompletion/>>, p. 7.

* cited by examiner

*Primary Examiner* — Susan McFadden
(74) *Attorney, Agent, or Firm* — Westman, Champlin & Kelly

(57) ABSTRACT

Multimodal interaction with grammar-based speech applications may be facilitated with a device by presenting permissible phrases that are in-grammar based on acceptable terms that are in-vocabulary and that have been recognized from a spoken utterance. In an example embodiment, a spoken utterance having two or more terms is received. The two or more terms include one or more acceptable terms. An index is searched using the acceptable terms as query terms. From the searching of the index, permissible phrase(s) are produced that include the acceptable terms. The index is a searchable data structure that represents multiple possible grammar paths that are ascertainable based on acceptable values for each term position of a grammar-based speech application. The permissible phrase(s) are presented to a user as option(s) that may be selected to conduct multimodal interaction with the device.

20 Claims, 8 Drawing Sheets

FACILITATING MULTIMODAL INTERACTION WITH GRAMMAR-BASED SPEECH APPLICATIONS

BACKGROUND

Human users can now interact with electronic devices using speech. In a speech interaction operation, a user may produce a verbal utterance that is received by an appropriately-configured device. The device attempts to recognize the verbal utterance to transform it into a textual representation. If successful, the device may interpret the text for any of a number of different purposes.

For example, the text may be displayed or stored so that the user may utilize it to prepare an email, a report, or another document. As another purpose, the speech interaction may enable the user to command and/or control the device. The device may respond to the text by performing a function, answering a question, and so forth.

Devices that are capable of speech interaction include mobile electronics, such as mobile phones and ultra-portable computers; vehicles with voice command systems; and call centers with voice-driven menus. The performance of these devices and their associated speech applications is dependent on the quality of the speech recognition. Unfortunately, many verbal utterances are not properly recognized using today's technology. Consequently, speech interaction with such devices can be severely hindered.

SUMMARY

Multimodal interaction with grammar-based speech applications may be facilitated with a device by presenting permissible phrases that are in-grammar based on acceptable terms that are in-vocabulary and that have been recognized from a spoken utterance. In an example embodiment, a spoken utterance including two or more terms is received. The two or more terms of the spoken utterance are not recognized as a permissible phrase that is in-grammar for a grammar-based speech application. One or more acceptable terms that are in-vocabulary are recognized from among the terms of the spoken utterance.

An index is searched using the acceptable terms as query terms. From the search of the index, at least one permissible phrase that is in-grammar and that includes the acceptable terms is produced. The index is a searchable data structure that represents multiple possible grammar paths that are ascertainable based on acceptable values for each term position of the grammar-based speech application. The permissible phrases are presented to a user as options that may be selected to conduct multimodal interaction with the device.

The permissible phrases may be presented visually or aurally to the user. Selection by the user may be effected by clicking on a visual user interface representation of an option or vocalizing at least a portion of a permissible phrase. Upon selection of a presented option, the device may implement functionality that is associated with the permissible phrase corresponding to the selected option. Acceptable terms that have been recognized from the utterance may belong to the beginning, middle, or end of a permissible phrase. Accordingly, the query terms may include wildcard operators.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

DETAILED DESCRIPTION

Figure 1:
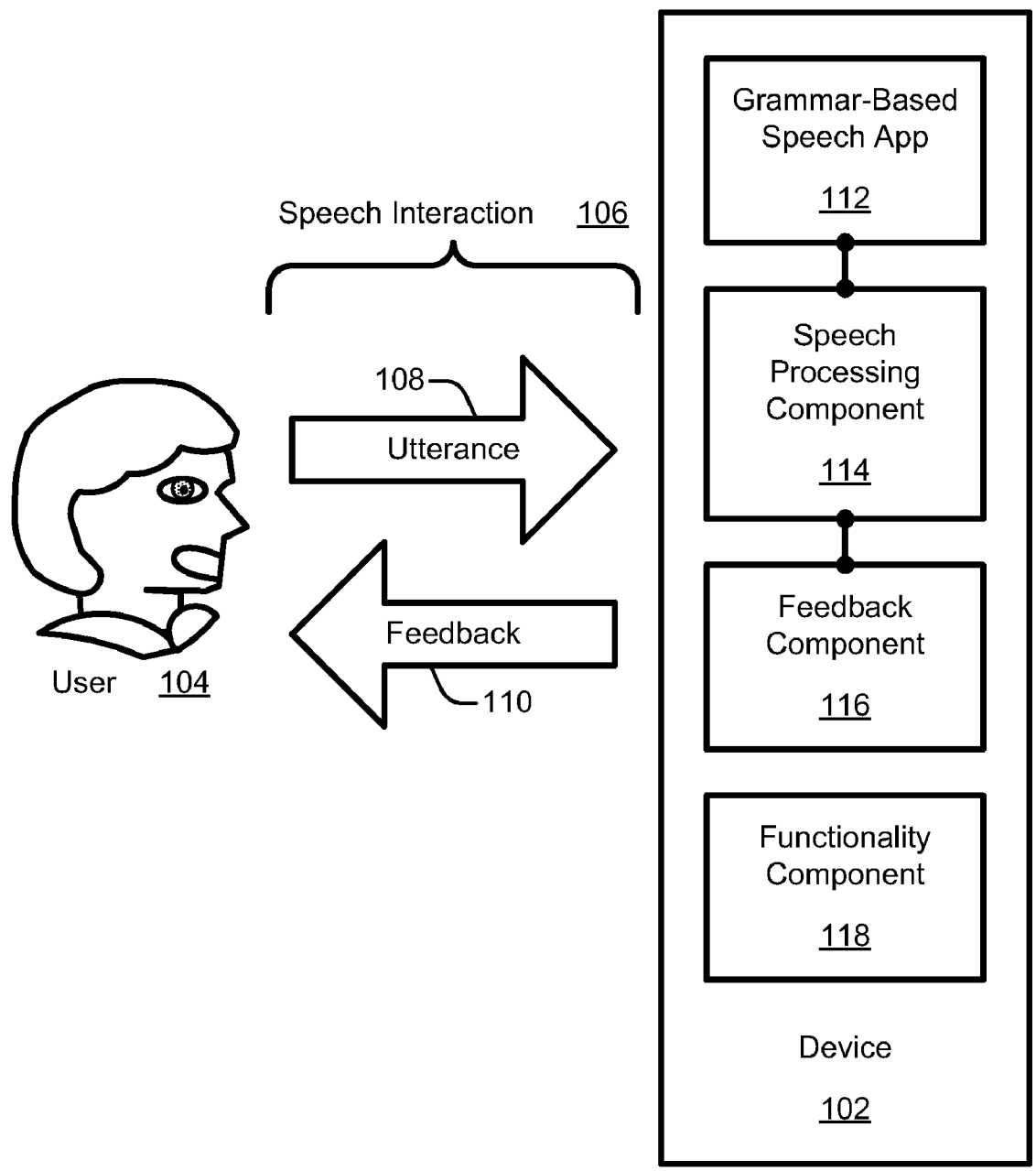
FIG. 1 illustrates an example speech interaction between a user and a device that involves an utterance.

As explained herein above, failure to recognize a spoken utterance and accurately transform it into text can severely hinder speech interaction with an electronic device. Speech applications appear to have significant potential for becoming popular with people. Possible uses include, but are not limited to, translating dictated speech to text, commanding a device, freeing hands from the burden of controlling a device, and so forth. By facilitating interaction, the widespread adoption of speech applications can be accelerated.

Speech applications can be roughly divided into two categories. One category of speech application attempts to recognize natural language speech. In such a natural language speech application, the speech processing is tasked with recognizing any uttered words of a given language as a speaker speaks naturally. This approach is relatively flexible, but it lacks accuracy because the possibilities for each word and phrase that are to be recognized are unconstrained.

Another category of speech application is a grammar-based speech application. Grammar-based speech applications are usually relatively more accurate than natural language ones. However, the words and phrases that a grammar-based speech application is capable of recognizing are predetermined (but potentially expandable). Acceptable words and permissible phrases that may be properly recognized are constrained by a predefined "proper" grammar. Acceptable words are those words that are in-vocabulary. Permissible phrases are those phrases that are in-grammar.

By narrowing the number of words and reducing the amount of phrases that may be uttered successfully, speech recognition accuracy may be increased. Grammar-based speech applications include, but are not limited to, those that are used for command and control purposes with a device. Thus, grammar-based speech applications are often implemented because they tend to be more effective than those of the open-ended, purely-natural-language category. This increased accuracy is true at least when a user is uttering acceptable words that form permissible phrases.

Hopefully, a given grammar-based speech application may be designed such that it is sufficiently like natural speech that people can use it easily. One way to make it more natural is to increase the number of acceptable words and/or permitted phrases. Increasing the overall size of the grammar can also increase the power of the grammar-based speech application. Unfortunately, when a grammar is large, users tend to forget which words are acceptable and/or which phrases are permitted.

When a user issues an utterance that is not proper for the grammar, the speech recognition process fails. In other words, if no permissible phrase is recognized, a conventional grammar-based speech application cannot process a received utterance. One approach is to present a list (e.g., a so-called n-best list) of the most likely words that might have been spoken by the user. However, this approach does not help a user to interact with the device via speech.

When speech recognition processing has failed, the user is still likely to want to accomplish some kind of interaction with the device. The speech recognition error may be due to the user's inexperience and lack of knowledge with the proper grammar. Hence, an alternative approach to responding to a speech recognition failure is to help a user to accomplish a desired task and teach the user the proper grammar. Doing so can facilitate current and/or future multimodal interactions between a user and a device.

In example embodiments generally, one or more terms of an utterance may be recognized as being in-vocabulary and therefore acceptable terms. The utterance overall, however, is not recognized as including a phrase that is in-grammar and thus a permissible phrase. The acceptable terms are used to determine at least one phrase that includes the acceptable terms and is permissible in accordance with the proper grammar of the grammar-based speech application. The at least one permissible phrase is then presented to the user as a selectable option in a user interface (UI). The user may select the option corresponding to the permissible phrase to implement an associated functionality.

The permissible phrase may be presented visually or aurally. Similarly, the user may select the corresponding option via a display screen by clicking on it (e.g., with a graphical UI (GUI)) or via a microphone by verbalizing at least a portion of the permissible phrase. By presenting the at least one permissible phrase based on the recognized acceptable terms as a selectable option, a device can help a user to accomplish a desired task. Furthermore, presentation of permissible phrase(s) can indirectly teach the user what grammar is proper for the grammar-based speech application.

FIG. 1 illustrates an example speech interaction 106 between a user 104 and a device 102 that involves an utterance 108. As illustrated, user 104 issues utterance 108 to device 102. Device 102 may provide feedback 110 to user 104. Device 102 includes a grammar-based speech application 112, a speech processing component 114, a feedback component 116, and a functionality component 118.

For example embodiments, speech interaction 106 includes utterance 108 and feedback 110. In operation, user 104 issues utterance 108 to device 102. Device 102 receives utterance 108 via, for example, a microphone or one or more transmission media. Speech processing component 114 is adapted to attempt to recognize utterance 108 as being one or more known sounds to a given level of certainty or accuracy. In other words, speech processing component 114 attempts to recognize a spoken utterance 108 and convert it into text.

Grammar-based speech application 112 is adapted to parse or otherwise analyze the recognized sounds and the text thereof to determine if they constitute proper grammar. As described further herein, grammar-based speech application 112 is capable of determining if the recognized sounds qualify as acceptable terms and permissible phrases. If acceptable in-vocabulary terms are recognized but no permissible in-grammar phrase is recognized, grammar-based speech application 112 produces permissible phrases that are in-grammar and that include the acceptable terms.

The permissible phrases are provided to feedback component 116. Feedback component 116 is adapted to present the permissible phrases to user 104 as feedback 110. User 104 is therefore empowered to select one of the permissible phrases. Upon detection of a user selection of one of the permissible phrases, the functionality associated with the selected permissible phrase is implemented by functionality component 118.

Each functionality component 118 is capable of implementing some functionality with device 102. Example functions include, but are not limited to, presenting requested information, answering a question, manipulating a menu, placing a call, playing music, presenting navigational information, starting an email, combinations thereof, and so forth. Grammar-based speech application 112, speech processing component 114, and/or feedback component 116 may be combined into one program. Alternatively, they may be individually or jointly realized as separate modules or parts of other programs.

Thus, in an example embodiment, device 102 is capable of facilitating multimodal interaction, including speech interaction. Device 102 includes a speech processing component 114 that accepts a spoken utterance 108 having two or more terms, with the two or more terms including one or more acceptable terms. Device 102 also includes a grammar-based speech application 112 and a feedback component 116.

Grammar-based speech application 112 includes an index and a search unit. The index is a searchable data structure that represents multiple possible grammar paths that are ascertainable based on acceptable values for each term position of the grammar-based speech application. The search unit searches the index using the one or more acceptable terms as query terms and produces at least one permissible phrase that includes the one or more acceptable terms. (Example implementations of an index and a search unit are described further herein below with particular reference to FIGS. 3-5.) Feedback component 116 presents the at least one permissible phrase to user 104 as at least one option that may be selected to conduct speech interaction with device 102.

In an example implementation, device 102 also includes a functionality component 118. In this implementation, feedback component 116 detects if user 104 selects an option corresponding to a permissible phrase. If so, functionality component 118 implements functionality that is associated with the permissible phrase corresponding to the selected option.

Figure 2:
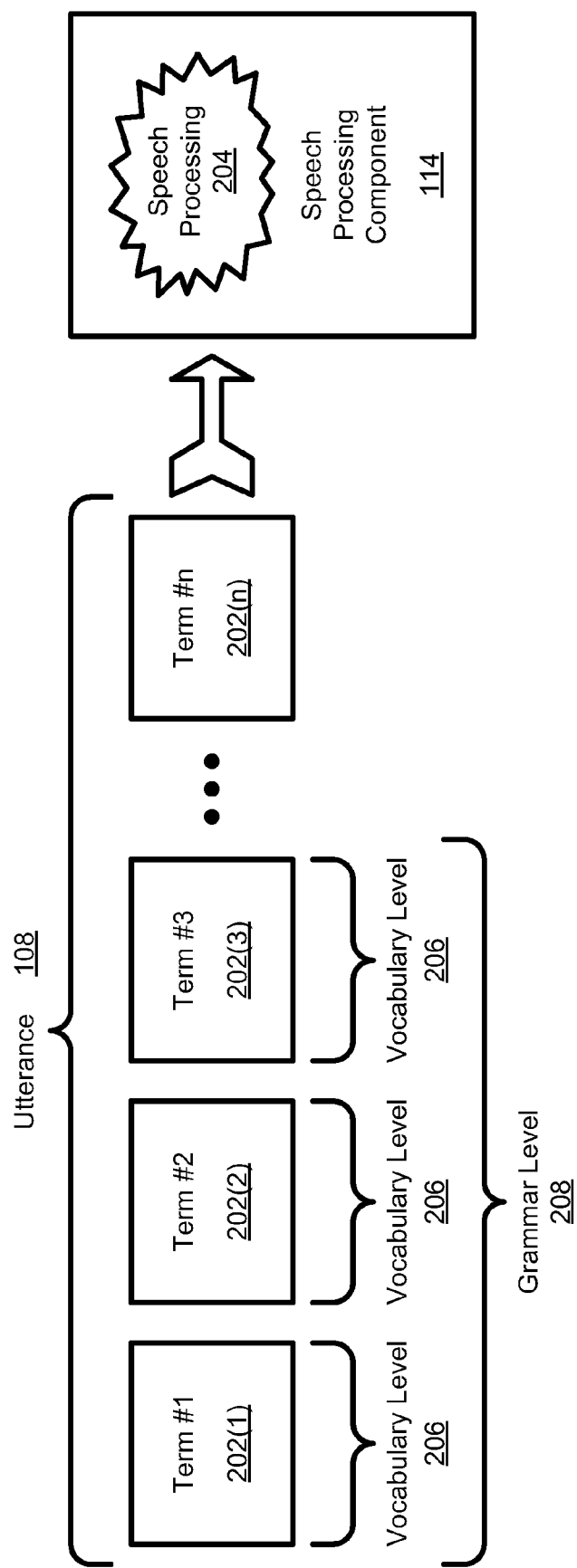
FIG. 2 illustrates aspects of an example utterance that includes multiple terms.

FIG. 2 illustrates aspects of an example utterance 108 that includes multiple terms 202. Utterance 108 includes up to "n" terms 202, with "n" representing a positive integer. More specifically, utterance 108 is illustrated as including term #1 202(1), term #2 202(2), term #3 202(3) . . . term #n 202(n). Utterance 108 is submitted for speech processing 204.

For example embodiments, speech processing 204 is performed by speech processing component 114. Thus, one or more terms 202 of a spoken utterance 108 are submitted to speech processing component 114 for speech processing 204. Each term 202 corresponds to and is processed at a vocabulary level 206. Two or more terms 202 correspond to and are also processed at a grammar level 208. Each term 202 may be formed from or include one or more words, characters, etc. of the language in which utterance 108 is spoken. Multiple terms 202 may form a phrase at grammar level 208.

The grammar for a particular grammar-based speech application may include any number of parts. These parts may form terms 202 (e.g., of FIG. 2). Many such grammars, however, include three parts, especially those of the command-and-control type of grammar-based speech applications. These three parts are: slots, keywords, and carrier phrases. Slots are the arguments in a phrase. Examples of slots include, but are not limited to, dates, names, contacts, musical selections, and so forth.

Keywords represent the semantic intention of a phrase and are often a type of command. Examples of keywords include, but are not limited to, call, play, show, appointments, and so forth. The so-called carrier phrases are intended to provide a more natural feel to the grammar-based language. Examples of carrier phrases include, but are not limited to, "What are my", prepositions, and so forth. It should be understood that a given grammar-based speech application may include different parts and/or a different number of parts.

An example general phrase for a grammar-based speech application may be represented by <keyword> <slot>. If the terms "call" for a keyword and "Tim" for a slot are in-vocabulary, then the phrase "Call Tim" may be in-grammar. Other examples for a given grammar may be: "Show Tim" to display Tim's contact information and "Play Beethoven's $5^{th}$" to play a musical selection. These examples include two term positions. However, a grammar may include more (or less) than two term positions. For instance, "Call Tim at Work" may be considered to include four term positions: <keyword> <slot> <carrier phrase> <slot>.

Figure 3:
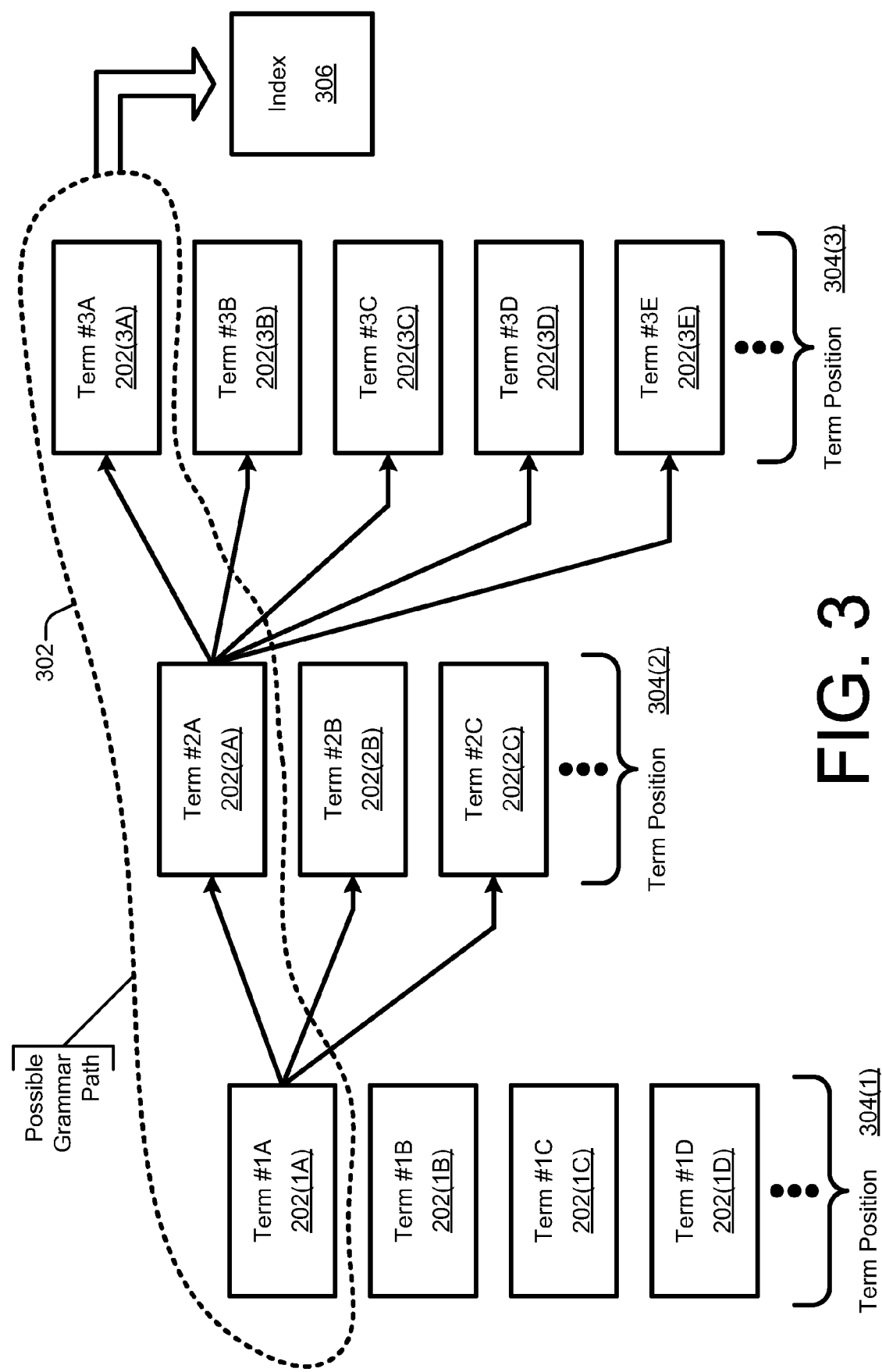
FIG. 3 illustrates an example of a traversal of possible grammar paths along term positions to create an index of permissible phrases in accordance with a grammar-based speech application.

FIG. 3 illustrates an example of a traversal of possible grammar paths 302 along term positions 304 to create an index 306 of permissible phrases in accordance with a grammar-based speech application. Although three term positions 304 are explicitly shown, a given grammar may include more or fewer term positions 304. As illustrated, a first term position 304(1) includes at least four terms 202(1A), 202(1B), 202(1C), 202(1D) . . . . A second term position 304(2) includes at least three terms 202(2A), 202(2B), 202(2C) . . . . A third term position 304(3) includes at least five terms 202 (3A), 202(3B), 202(3C), 202(3D), 202(3E) . . . . Each term position 304 may alternatively include more or fewer terms 202.

Each term 202 may take different values from one or more acceptable words that are in-vocabulary and correspond to the given term 202. Grammar-level constraints affect which values may be strung together into possible grammar paths 302 that correspond to permissible phrases that are in-grammar. For example, a keyword "Call" may be followed by any of the known contact names. It is given that there are three contact names: Tim, Tom, and Bob. The following three phrases would then be permissible in-grammar phrases: "Call Tim", "Call Tom", and "Call Bob".

For example embodiments, permissible phrases that are in-grammar are discoverable by traversing possible grammar paths 302. Generally, possible grammar paths 302 are traversed to ascertain permissible phrases that are in-grammar. Index 306 for the permissible phrases is created from the possible grammar paths 302. To traverse possible grammar paths 302, each acceptable value (e.g., word or words) for an existing term 202 for a current term position 304 is iterated through. An acceptable value may be, by way of example but not limitation, a specific word or words (e.g., "John", "Itsy Bitsy Spider", etc.), abstractions of words (e.g., <name>, <musical selection>, etc.), and so forth. Word abstractions may also be referred to as "semantic tags".

The iterations are continued recursively for each acceptable value for each term 202 for each term position 304. Each of the traversed possible grammar paths 302 corresponds to a permissible phrase that is in-grammar. The permissible phrases are collected for index 306. A more specific example approach to creating index 306 is described below with particular reference to FIG. 4. The process of traversing possible grammar paths 302, the process of creating index 306, and index 306 itself may be streamlined and/or compressed.

Figure 4:
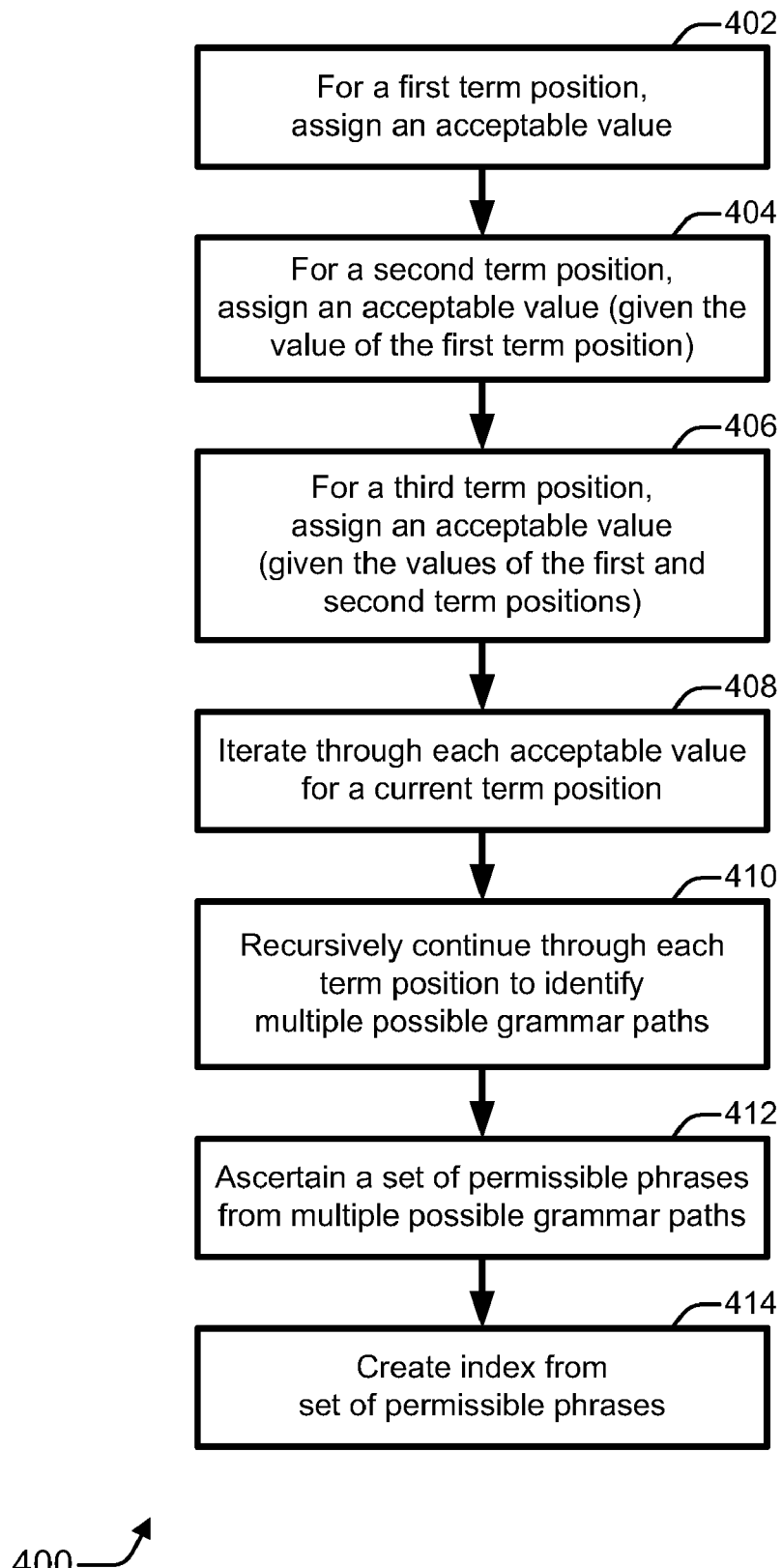
FIG. 4 is a flow diagram that illustrates an example of a method for traversing possible grammar paths to create an index of permissible phrases.

FIG. 4 is a flow diagram 400 that illustrates an example of a method for traversing possible grammar paths to create an index of permissible phrases. Flow diagram 400 includes seven blocks 402-414. Implementations of flow diagram 400 may be realized, for example, as processor-executable instructions and/or as part of grammar-based speech application 112 and/or speech processing component 114. Example embodiments for implementing flow diagram 400 are described below in conjunction with the description of FIGS. 2 and 3. It should be understood that the acts of flow diagram 400 may be fully or partially performed so as to create the index in an offline manner (e.g., before interacting with a user) or in an online/real-time manner (e.g., while interacting with a user).

Figure 8:
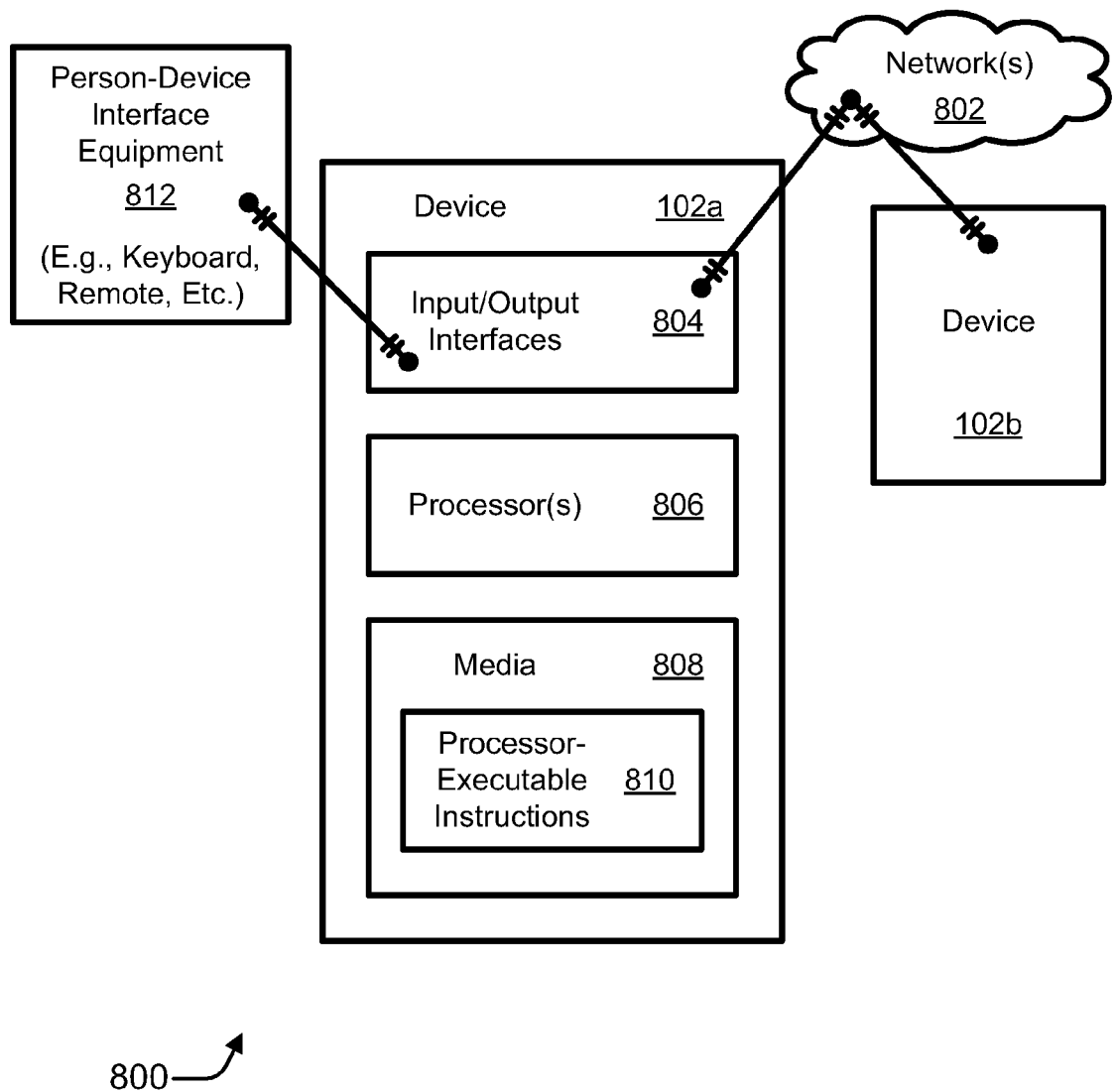
FIG. 8 is a block diagram illustrating example devices that may be used to implement embodiments for facilitating multimodal interaction with grammar-based speech applications.

The acts of flow diagrams 400 and 600 (of FIGS. 4 and 6) that are described herein may be performed in many different environments and with a variety of different devices, such as by one or more processing devices (e.g., of FIGS. 1 and 8). The order in which the methods are described is not intended to be construed as a limitation, and any number of the described blocks can be combined, augmented, rearranged, and/or omitted to implement a respective method, or an alternative method that is equivalent thereto. Although specific elements of certain other FIGS. are referenced in the description of these flow diagrams, the methods may be performed with alternative elements.

For example embodiments, at block 402, an acceptable value is assigned to a first term position. As noted above, an acceptable value may be specific word(s), word abstractions, and so forth. At block 404, given the value assigned to the first term position, an acceptable value is assigned to a second term position. For example, acceptable values may be assigned to a first term position 304(1) and a second term position 304(2). For instance, if a value of "Call" is assigned to first term position 304(1), a contact name may be assigned to second term position 304(2).

At block 406, given the values assigned to the first and second term positions, an acceptable value is assigned to a third term position (when relevant to an in-grammar construct). When fourth or subsequent term positions are relevant to a particular possible grammar path, acceptable values are assigned to them as well.

At block 408, each acceptable value for a current term position is iterated through. For a slot directed to musical selections or contact names, for example, there may be hundreds, thousands, or more acceptable values. At block 410, the iterative traversal is recursively continued through each term position to identify multiple possible grammar paths. For example, for each term position 304 and acceptable term 202 that currently exists and is proper in accordance with a grammar-based speech application, the assignment of values may be carried out to discover possible grammar paths 302.

At block 412, a set of permissible phrases that are in-grammar are ascertained from the multiple possible grammar paths that have been traversed. At block 414, an index is created from the set of permissible phrases. For example, from permissible phrases corresponding to ascertained possible grammar paths 302, index 306 may be created.

Figure 5:
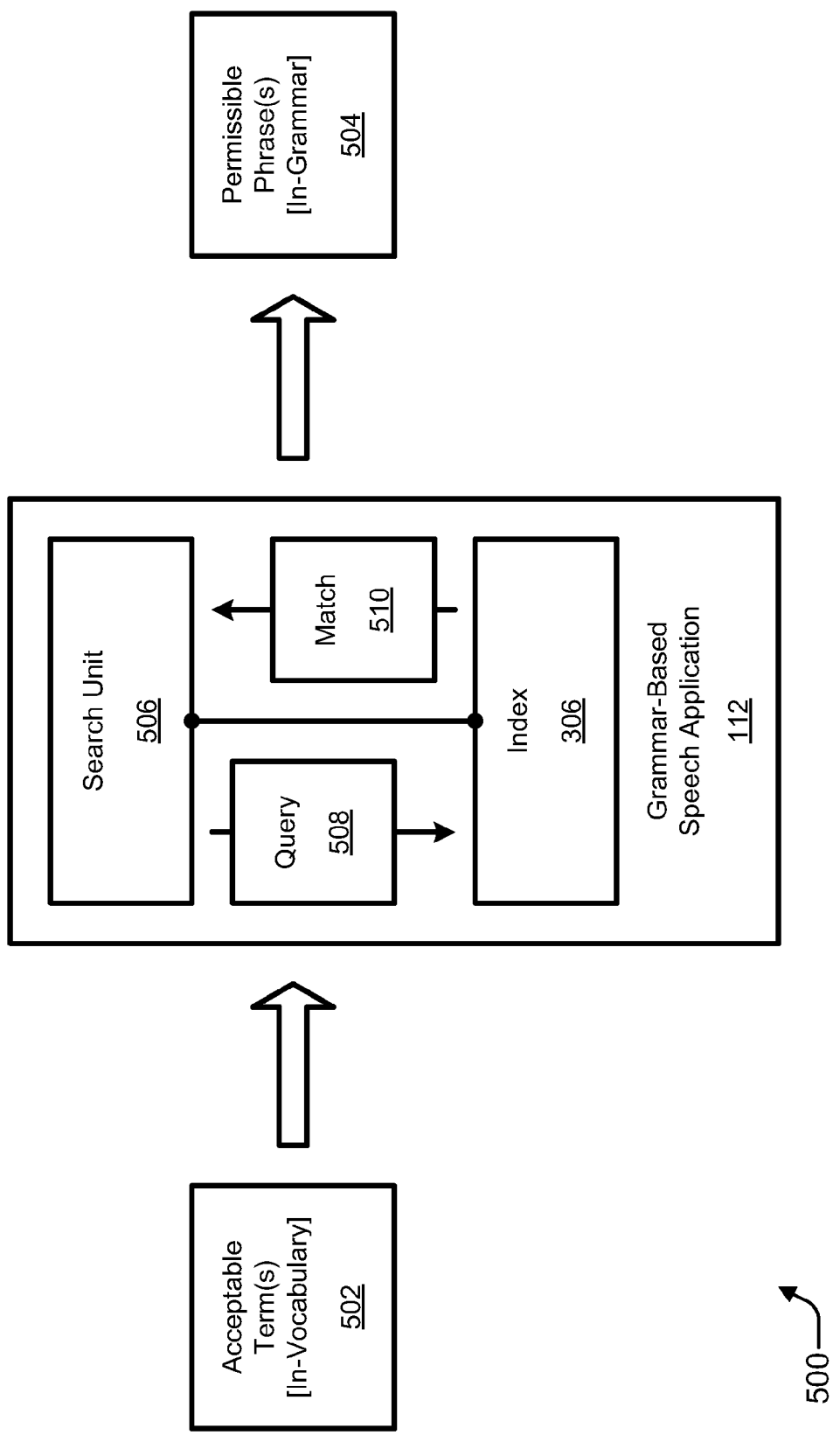
FIG. 5 is a block diagram of an example grammar-based speech application that produces permissible phrases based on acceptable terms using an index.

FIG. 5 is a block diagram 500 of an example grammar-based speech application 112 that produces permissible phrases 504 based on acceptable terms 502 using an index 306. As illustrated, grammar-based speech application 112 includes index 306, a search unit 506, a query 508, and at least one match 510. For example embodiments, an acceptable term 502 is a term that is in-vocabulary for a given grammar-based speech application. A permissible phrase 504 is a phrase that is in-grammar for the given grammar-based speech application.

In an example operation, one or more acceptable terms 502 are provided to or otherwise available at grammar-based speech application 112. Generally, grammar-based speech application 112 produces at least one permissible phrase 504 based on acceptable terms 502. More specifically, search unit 506 forms query 508 from acceptable terms 502. Hence, query 508 includes one or more query terms. Query 508 is submitted to index 306. Query 508 may include one or multiple wildcards. The wildcard(s) may be located on either side of the acceptable term(s), on both sides of the acceptable term(s), and/or between them when there are two or more acceptable terms. From index 306, at least one match 510 (e.g., a matching permissible phrase 504) is retrieved.

In other words, at least one permissible phrase 504 that includes acceptable terms 502 is retrieved by search unit 506 from index 306. The retrieved permissible phrases 504 thus properly comport with the grammar-based speech application 112 and relate to those terms that were recognized and that are in-vocabulary. As is described further herein below with particular reference to FIGS. 6 and 7, permissible phrases 504 may be presented to the user as options to enable the user to select one and thus cause the device to implement the associated functionality.

Figure 6:
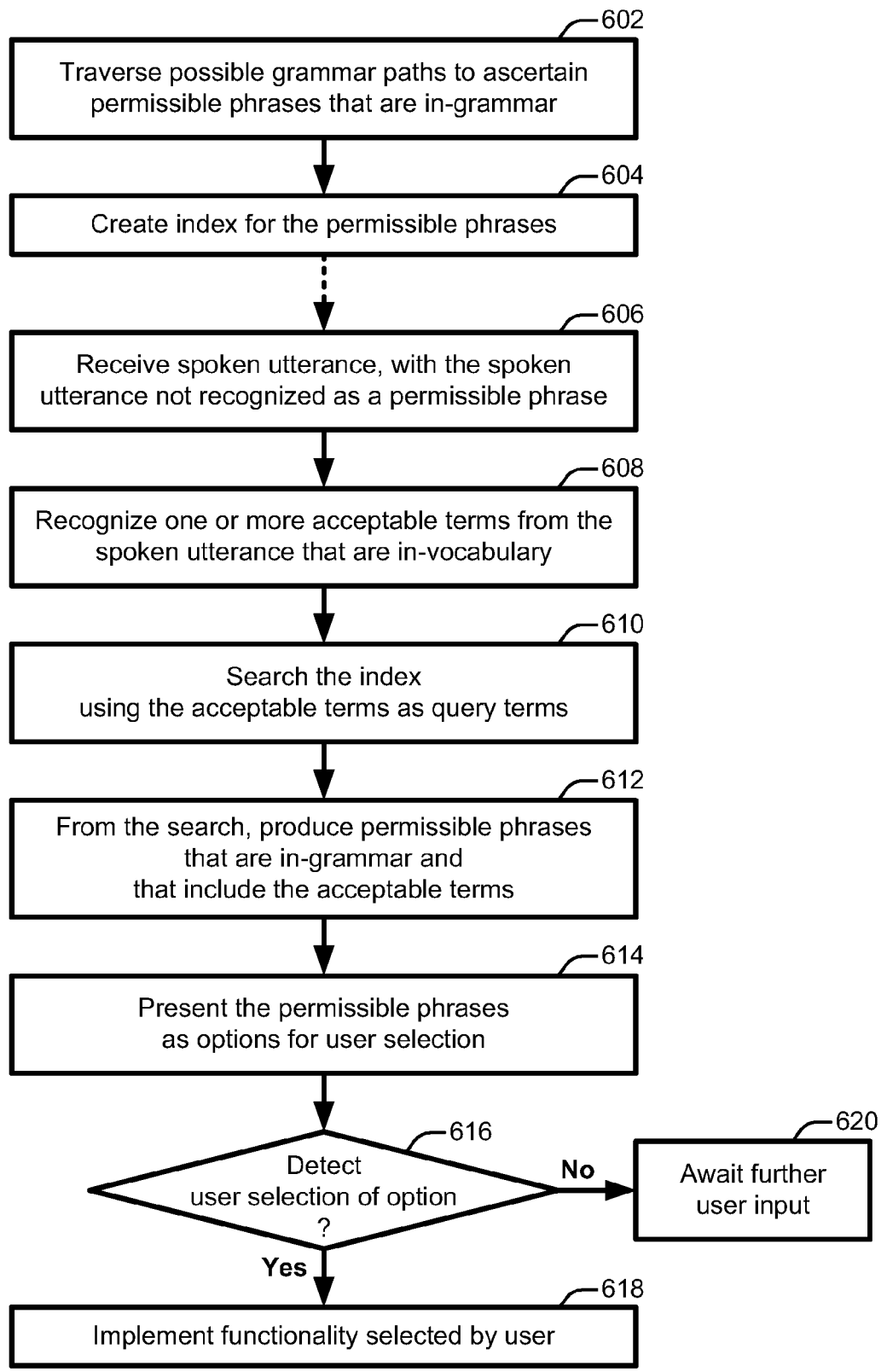
FIG. 6 is a flow diagram that illustrates an example of a method for facilitating multimodal interaction with grammar-based speech applications.

FIG. 6 is a flow diagram 600 that illustrates an example of a method for facilitating multimodal interaction with grammar-based speech applications. Flow diagram 600 includes 10 blocks 602-620. Implementations of flow diagram 600 may be realized, for example, as processor-executable instructions and/or as part of grammar-based speech application 112 and/or speech processing component 114. Example embodiments for implementing flow diagram 600 are described below in conjunction with the description of FIGS. 1-3 and 5.

For example embodiments, at block 602, possible grammar paths are traversed to ascertain permissible phrases that are in-grammar. For example, possible grammar paths 302, which may be formed from acceptable values for terms 202 at different term positions 304, may be traversed to ascertain phrases that are permissible in accordance with a predefined grammar that is proper for a grammar-based speech application.

At block 604, an index is created for the permissible phrases. For example, an index 306 may be created for the permissible phrases corresponding to the traversed possible grammar paths 302. The actions of blocks 602 and 604 may be performed once, may be performed periodically, may be performed upon the occurrence of a given event (e.g., a new acceptable value for a term 202 has been provided), may be performed each time an utterance is received, or at some other timing or frequency. Also, as noted above, the actions of blocks 602 and/or 604 may be performed online or offline.

At block 606, a spoken utterance is received in which the spoken utterance is not recognized as including a permissible phrase. For example, an utterance 108, which includes two or more terms 202, may be received by a device 102. The receipt may entail, for instance, receiving utterance 108 "directly" from user 104 via a microphone or "indirectly" over one or more transmission media.

At block 608, one or more acceptable terms from the spoken utterance that are in-vocabulary are recognized. For example, speech processing 204 by speech processing component 114 may recognize one or more terms 202 that are in-vocabulary and therefore acceptable to grammar-based speech application 112. However, it is determined that utterance 108 does not include a recognized permissible phrase that is in-grammar. The level of certainty and/or accuracy of the speech "recognition" hypothesis that is to be met before a term is to be considered as recognized may be adjusted or allowed to be variable or probabilistic.

At block 610, the index is searched using the acceptable terms as query terms. For example, acceptable terms 502 may be converted into a query 508, with or without wildcard operators, and submitted to index 306 by a search unit 506. At block 612, permissible phrases that are in-grammar and that include the acceptable terms are produced from the search. For example, search unit 506 may retrieve at least one match 510 from index 306 with each match 510 corresponding to a permissible phrase 504. It should be noted that a given permissible phrase may be considered a match 510 when a portion or subset of the recognized acceptable terms are included in the permissible phrase, especially if no permissible phrase is found with all of the acceptable terms.

At block 614, the permissible phrases are presented as options for user selection. For example, matching permissible phrases 504 may be presented to a user 104 as options that are available for selection with one or more input/output (I/O) interfaces. The presentation may be made, for instance, with a display screen, with a speaker, a combination thereof, and so forth. More specifically, the presentation to the user of option(s) corresponding to the permissible phrase(s) may be made visually via a display screen, with the option(s) being visually displayed as one or more of text, icons, or pictures (e.g., album cover art). The presentation to the user of option(s) corresponding to the permissible phrase(s) may be made aurally via a speaker instead of or in addition to using a display screen. Other presentation examples are described herein below with particular reference to FIGS. 7A and 7B.

At block 616, it is detected if a user selects an option. For example, device 102 may detect if user 104 selects an option corresponding to a permissible phrase by monitoring a screen input, a verbal input, and so forth. More specifically, it may be detected if the user: touches an option on a display screen, clicks on the option on the display screen, gestures with respect to the option on the display screen, vocalizes the option, or vocalizes a part of the option that was not previously spoken. For instance, user 104 may select a visually-displayed permissible phrase by "clicking" on it, e.g., with a mouse or touch interface. Alternatively, user 104 may speak the complete and correct phrase or an identifier thereof (e.g., option "A" or "One"). A user may also speak a portion of the complete and correct phrase (e.g., a new portion that was not spoken previously).

If it is detected that the user has selected a presented permissible phrase option (at block 616), then at block 618 the functionality that is associated with the permissible phrase corresponding to the selected option is implemented. For example, a contact may be called, a musical selection may be played, a menu item may be engaged, and so forth. If, on the other hand, no option is detected as being selected (at block 616), then at block 620 the device may await further user input.

Future presentations and/or the index may be adjusted based on feedback from the user. For example, either or both may be adjusted based on which option a user has previously selected. Once a user has selected an option corresponding to a given permissible phrase, there is a probability that the user will want to select this option again in the future. Accordingly, feedback component 116 and/or grammar-based speech application 112 (of FIGS. 1 and 5) may keep track of how frequently different grammar paths have been selected by the user, using frequency counts in the index for example. Thereafter, permissible phrases may be produced (e.g., by retrieving them from the index) and/or presented based in part on the frequency at which they have been selected historically. A frequently-selected permissible phrase may, for instance, be retrieved instead of or presented prior to permissible phrases that have been selected less frequently. The frequency counts may also be used to affect recognition of acceptable terms.

Figure 7A:
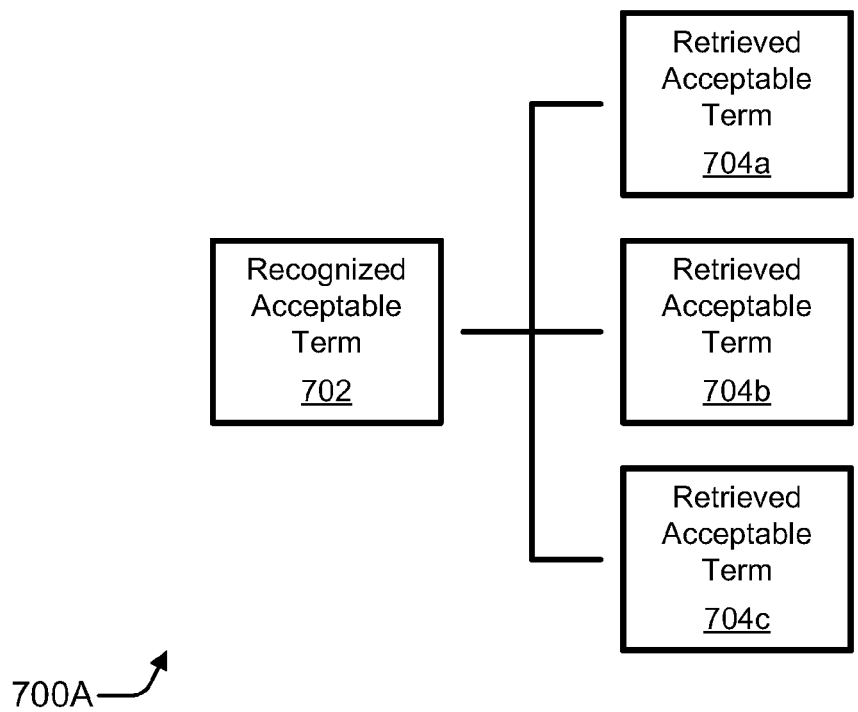
FIGS. 7A and 7B are block diagrams showing an example forward case and an example backward case, respectively, for presenting permissible phrases to a user.
Figure 7B:
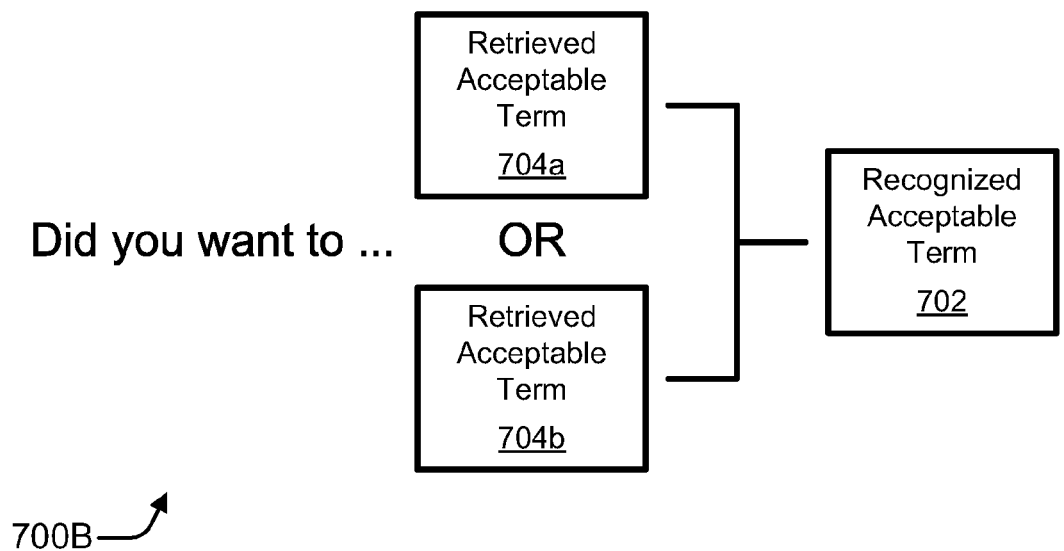

FIGS. 7A and 7B are block diagrams 700A and 700B that show an example forward case and an example backward case, respectively, for presenting permissible phrases to a user. As illustrated, each block diagram 700A and 700B includes a recognized acceptable term 702 and multiple retrieved acceptable terms 704. Specifically, block diagram 700A includes three retrieved acceptable terms 704a, 704b, and 704c. Block diagram 700B includes two retrieved acceptable terms 704a and 704b. However, a given forward and backward case may include any number of recognized acceptable terms 702 or retrieved acceptable terms 704 according to the circumstances.

For example embodiments, each recognized acceptable term 702 corresponds to an acceptable term 502 that was recognized as a term 202 of a spoken utterance 108 (e.g., of FIG. 2). Each retrieved acceptable term 704 corresponds to a term that is part of a permissible phrase 504 but that was not recognized from utterance 108. Hence, a retrieved acceptable term 704 was retrieved from index 306 during a search. Combining recognized acceptable term 702 with a retrieved acceptable term 704a/704b/704c results in a permissible phrase 504. It should be understood that the UI presentations of block diagrams 700A and 700B may be made visually and/or aurally. When made visually, they may be displayed as text, icons, pictures, a combination thereof, and so forth.

A general example is described first. A "forward" case of block diagram 700A is described second. A description of a "backward" case of block diagram 700B is provided third. These cases are explained in terms of an example voice command scenario, but they are also applicable to other scenarios. In an example implementation, when the permissible phrases are presented visually, retrieved acceptable terms 704 may be displayed as selectable buttons. The buttons may be selected by a user with a mouse click, a finger or stylus touch, and so forth.

For the first general example, suppose a user says, "Show me my appointments." This phrase is given to be out-of-grammar in this instance. With conventional systems, such an utterance results in a false recognition, and the conventional system fails. In contrast, with an example embodiment as described herein, a system that facilitates multimodal interaction may detect the term(s) "my appointments" with high recognition. A search may then be conducted using "*my*appointments*" as query term(s). The asterisk character ("*") is a wildcard operator. This search retrieves for this example: "{What are} my appointments for {today|tomorrow}". The terms "What are," "today," and "tomorrow" correspond to retrieved acceptable terms 704. The latter two are selectable to implement associated functionality. The former term is pedagogical.

The second example is for a forward case as in FIG. 7A. Suppose that a user remembers just the beginning of what to say. For instance, a user may utter "What are my . . . ". This utterance that is a partial phrase also results in a false recognition with a conventional system. In contrast, with an example embodiment as described herein, a system that facilitates multimodal interaction may present the in-vocabulary terms that can complete the initial term(s) to form an in-grammar phrase. From the permissible phrases that are presented visually or aurally, the user can select one. For example, the user may either click on or say the remainder of the permissible phrase (e.g., if the grammar-based speech application is constrained to enable completions), or the user may speak the entire permissible phrase.

With reference to block diagram 700A, a partially permissible phrase is uttered. The partial phrase is given to be "What is my . . . " and is in-grammar for the initial portion of a permissible phrase. Hence, but by way of example only, recognized acceptable term(s) 702 may correspond to "What is my . . . ". It is given that the following terms may complete the partial phrase as a full permissible phrase: Battery Strength, Signal Strength, and Calendar. Retrieved acceptable term 704a may correspond to "Battery Strength." Retrieved acceptable term 704b may correspond to "Signal Strength." Retrieved acceptable term 704c may correspond to "Calendar."

The third example is for a backward case as in FIG. 7B. Suppose a user utters "Telephone Tim." It is given that "telephone" is not in-grammar as an initial word in this instance; consequently, a speech recognizer of a conventional system fails to find any recognition path for "telephone." Because speech recognition is performed from left to right (e.g., with the English language), the conventional system results in a failure. In contrast, with an example embodiment as described herein, a system that facilitates multimodal interaction may implement a backoff grammar. Generally, a backoff grammar expands the coverage of the original grammar-based language. A backoff grammar may, by way of example but not limitation, be based on having garbage models (e.g., acoustic phone loops) around the keywords and slots. Alternatively, a back-off grammar may implement a statistical language model.

Thus, after "Telephone Tim" fails, a grammar-based speech application as described herein may implement a backoff grammar that catches the contact slot in the rule for " . . . <contact> . . . ". In this situation, and when the backoff grammar is implemented with wildcard operators, the rule may be submitted as a query to the WildThing, with the garbage models (" . . . ") as wildcards ("*"). This approach can then produce: "{Show|Call} Tim". It should be understood that the backward case may be implemented with alternative mechanisms.

With reference to block diagram 700B, an impermissible phrase is uttered. The impermissible phrase is given to be "Telephone Timothy Thomas at Work." Hence, but by way of example only, recognized acceptable term 702 may correspond to "Timothy Thomas", assuming this is a recognized contact and that these words are therefore individually and/or jointly acceptable terms. It is given that the system enables a user to request that a contact be called or shown. The system can thus produce: "Did you want to {Show|Call} Timothy Thomas at Work?" Retrieved acceptable term 704a may correspond to "Call." Retrieved acceptable term 704b may correspond to "Show." Recognized acceptable terms 702 may therefore correspond to "Timothy Thomas at Work". Uttering a desired permissible phrase or selecting a desired retrieved acceptable term 704a or 704b may cause the device to implement the associated functionality.

FIG. 8 is a block diagram 800 illustrating example devices 102 that may be used to implement embodiments for facilitating multimodal interaction with grammar-based speech applications. As illustrated, block diagram 800 includes two devices 102a and 102b, person-device interface equipment 812, and one or more network(s) 802. As explicitly shown with device 102a, each device 102 may include one or more input/output interfaces 804, at least one processor 806, and one or more media 808. Media 808 may include processor-executable instructions 810.

For example embodiments, device 102 may represent any processing-capable device. Example devices 102 include personal or server computers, mobile phones, hand-held or other portable electronics, entertainment appliances, network components, some combination thereof, and so forth. A device 102 may also comprise an embedded machine, a vehicle, a set of server computers, and so forth. Device 102a and device 102b may communicate over network(s) 802.

Network(s) 802 may be, by way of example but not limitation, an internet, an intranet, an Ethernet, a public network, a private network, a cable network, a digital subscriber line (DSL) network, a telephone network, a wireless network, some combination thereof, and so forth. Person-device interface equipment 812 may be a keyboard/keypad, a touch screen, a remote, a mouse or other graphical pointing device, a display screen, a microphone, a speaker, a combination thereof, and so forth. Person-device interface equipment 812 may be integrated with or separate from device 102a.

I/O interfaces 804 may include (i) a network interface for monitoring and/or communicating across network 802, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 812. A given interface may function as both a display device interface and a person-device interface.

Processor 806 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 808 may be any available media that is included as part of and/or is accessible by device 102. It includes volatile and non-volatile media, removable and non-removable media, storage and transmission media (e.g., wireless or wired communication channels), hard-coded logic media, combinations thereof, and so forth. Media 808 is tangible media when it is embodied as a manufacture and/or as a composition of matter.

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 102. Processor-executable instructions 810 may be embodied as software, firmware, hardware, fixed logic circuitry (e.g., that may include processing capabilities), some combination thereof, and so forth.

Thus, realizations for facilitating multimodal interaction with grammar-based speech applications may be described in the general context of processor-executable instructions. Processor-executable instructions may include routines, programs, applications, coding, modules, protocols, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 808 comprises at least processor-executable instructions 810. Processor-executable instructions 810 may comprise, for example, grammar-based speech application 112, speech processing component 114, feedback component 116, and/or functionality component 118 (of FIGS. 1, 2, and 5). Generally, processor-executable instructions 810, when executed by processor 806, enable device 102 to perform the various functions described herein. Such functions include, by way of example but not limitation, those that are illustrated in flow diagrams 400 and 600 (of FIGS. 4 and 6) and those pertaining to features illustrated in the various block diagrams, as well as combinations thereof, and so forth.

The devices, acts, features, functions, methods, modules, data structures, techniques, components, etc. of FIGS. 1-8 are illustrated in diagrams that are divided into multiple blocks and other elements. However, the order, interconnections, interrelationships, layout, etc. in which FIGS. 1-8 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for facilitating multimodal interaction with grammar-based speech applications.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. One or more processor-accessible tangible storage media storing processor-executable instructions for facilitating multimodal interaction, wherein the processor-executable instructions, when executed by a processor, perform a method comprising:

receiving a spoken utterance including two or more terms, the two or more terms not being recognized as a permissible phrase that is in-grammar for a grammar-based speech application;

recognizing one or more acceptable terms that are in-vocabulary from among the two or more terms of the spoken utterance;

searching an index using the one or more acceptable terms as query terms;

producing, from the searching of the index, at least one permissible phrase that is in-grammar and that includes the one or more acceptable terms; the index comprising a searchable data structure that represents multiple possible grammar paths that are ascertainable based on acceptable values for each term position of the grammar-based speech application; and presenting at least one permissible phrase to a user as at least one option that may be selected to conduct multi-modal interaction with the device.

2. The one or more processor-accessible tangible storage media as recited in claim 1, wherein the method comprises:

detecting if the user selects the at least one option corresponding to the at least one permissible phrase; and if the user is detected to select the at least one option, implementing functionality associated with the at least one permissible phrase.

3. The one or more processor-accessible tangible storage media as recited in claim 1, wherein the method comprises:

traversing the multiple possible grammar paths of the grammar-based speech application based on the acceptable values for each term position of the grammar-based speech application;

ascertaining, from the traversing of the multiple possible grammar paths, phrases that are permissible in accordance with the grammar-based speech application; and creating the index from the phrases that are permissible in accordance with the grammar-based speech application.

4. The one or more processor-accessible tangible storage media as recited in claim 1, wherein the grammar-based speech application comprises a command-and-control speech application; and wherein types of terms of the grammar-based speech application include slots, keywords, and carrier phrases.

5. The one or more processor-accessible tangible storage media as recited in claim 1, wherein the method comprises:

tracking a frequency at which the user selects the at least one option corresponding to the at least one permissible phrase; and during another operation, repeating the act of recognizing, the act of producing, or the act of presenting with regard to the tracked frequency at which the user has selected the at least one option corresponding to the at least one permissible phrase.

6. A computer-implemented method for facilitating multi-modal interaction, the method comprising:

receiving a spoken utterance having two or more terms, the two or more terms including one or more acceptable terms;

searching an index using the one or more acceptable terms as query terms;

producing using a computer processor, from the searching of the index, at least one permissible phrase that includes the one or more acceptable terms; the index comprising a searchable data structure that represents multiple possible grammar paths that are ascertainable based on acceptable values for each term position of a grammar-based speech application; and presenting the at least one permissible phrase to a user as at least one option that may be selected to conduct multi-modal interaction with the device.

7. The method as recited in claim 6, wherein receiving comprises:

receiving the spoken utterance via at least one microphone or one or more transmission media.

8. The method as recited in claim 6, further comprising:

recognizing from the spoken utterance that the one or more acceptable terms are in-vocabulary in accordance with the grammar-based speech application using a speech recognition processing mechanism; and failing to recognize the spoken utterance as including a permissible phrase that is in-grammar in accordance with the grammar-based speech application.

9. The method as recited in claim 6, wherein presenting comprises:

presenting the at least one permissible phrase to the user as the at least one option visually via a display screen, wherein the at least one option is visually displayed as one or more of text, icons, or pictures; or presenting the at least one permissible phrase to the user as the at least one option aurally via a speaker.

10. The method as recited in claim 9, further comprising:

detecting if the user selects the at least one option corresponding to the at least one permissible phrase;

wherein the act of detecting comprises detecting if the user: touches the at least one option on the display screen, clicks on the at least one option on the display screen, gestures with respect to the at least one option on the display screen, vocalizes the at least one option, or vocalizes a part of the at least one option that was not previously spoken.

11. The method as recited in claim 6, further comprising:

traversing the multiple possible grammar paths of the grammar-based speech application based on the acceptable values for each term position of the grammar-based speech application to ascertain phrases that are permissible in accordance with the grammar-based speech application; and creating the index from the phrases that are permissible in accordance with the grammar-based speech application.

12. The method as recited in claim 11, wherein the traversing comprises:

for a current term position, assigning an acceptable value that is in-vocabulary for the grammar-based speech application;

iterating through each acceptable value for the current term position;

recursively continuing through each term position in accordance with the grammar-based speech application to identify the multiple possible grammar paths; and ascertaining the phrases that are permissible in accordance with the grammar-based speech application from the identified multiple possible grammar paths and the acceptable values.

13. The method as recited in claim 6, wherein producing comprises:

retrieving from the index one or more retrieved acceptable terms as part of the at least one permissible phrase;

wherein the method further comprises:

for a forward case in which the one or more acceptable terms from the spoken utterance comprise one or more recognized acceptable terms that initiate the at least one permissible phrase, presenting the one or more recognized acceptable terms followed by the one or more retrieved acceptable terms.

14. The method as recited in claim 6, wherein producing comprises:

retrieving from the index one or more retrieved acceptable terms as part of the at least one permissible phrase;

wherein the method further comprises:

for a backward case in which the one or more acceptable terms from the spoken utterance comprise one or more recognized acceptable terms that do not initiate the at least one permissible phrase, presenting the one or more retrieved acceptable terms followed by the one or more recognized acceptable terms.

15. A device for facilitating multimodal interaction, the device comprising:

a processor;

a speech processing component to receive a spoken utterance having two or more terms, the two or more terms including one or more acceptable terms;

a grammar-based speech application including an index and a search unit; the index comprising a searchable data structure that represents multiple possible grammar paths that are ascertainable based on acceptable values for each term position of the grammar-based speech application; the search unit to search the index using the one or more acceptable terms as query terms and to produce, using the processor, at least one permissible phrase that includes the one or more acceptable terms; and a feedback component to present the at least one permissible phrase to a user as at least one option that may be selected to conduct multimodal interaction with the device.

16. The device as recited in claim 15, wherein each of the two or more terms comprises one or more words, and the one or more acceptable terms comprise words that are in-vocabulary; and wherein the at least one permissible phrase comprises at least one phrase that is in-grammar in accordance with the grammar-based speech application.

17. The device as recited in claim 15, wherein the device comprises a mobile device; or wherein the device comprises at least part of a vehicle.

18. The device as recited in claim 15, wherein the feedback component is to detect if the user selects the at least one option corresponding to the at least one permissible phrase; and wherein the device further comprises:

at least one functionality component to implement functionality associated with the at least one permissible phrase if the user is detected to select the at least one option.

19. The device as recited in claim 15, wherein the grammar-based speech application is adapted to handle a forward case, in which the one or more acceptable terms from the spoken utterance comprise one or more recognized acceptable terms that are recognizable as initiating the at least one permissible phrase, by presenting the one or more recognized acceptable terms followed by one or more retrieved acceptable terms that are retrieved from the index during the search; and wherein the grammar-based speech application is adapted to handle a backward case, in which the one or more acceptable terms from the spoken utterance comprise one or more recognized acceptable terms that do not initiate the at least one permissible phrase, using a back-off grammar and by presenting one or more retrieved acceptable terms followed by the one or more recognized acceptable terms.

20. The device as recited in claim 15, wherein the speech processing component fails to recognize the spoken utterance as including a permissible phrase that is in-grammar for the grammar-based speech application; and wherein the grammar-based speech application is to traverse the multiple possible grammar paths of the grammar-based speech application based on the acceptable values for each term position of multiple term positions to ascertain phrases that are permissible in accordance with the grammar-based speech application; and wherein the grammar-based speech application is to create the index from the phrases that are permissible in accordance with the grammar-based speech application.

* * * * *